United States Patent
Bleggi

(10) Patent No.: US 6,632,475 B1
(45) Date of Patent: Oct. 14, 2003

(54) METHOD OF LINING UNDERGROUND PIPES AND APPARATUS FOR PERFORMING THE METHOD

(76) Inventor: Nicola Bleggi, 15753 Swathmore La., Livonia, MI (US) 48154

( * ) Notice: Subject to any disclaimer, the term of this patent is extended or adjusted under 35 U.S.C. 154(b) by 0 days.

(21) Appl. No.: 09/884,769

(22) Filed: Jun. 19, 2001

Related U.S. Application Data

(60) Provisional application No. 60/238,804, filed on Oct. 6, 2000.

(51) Int. Cl.[7] .............................. B05D 1/02; B05D 7/22
(52) U.S. Cl. ...................... 427/236; 427/230; 427/239; 427/421; 427/422; 427/426; 118/302; 118/306; 118/317; 118/DIG. 10; 138/145
(58) Field of Search ................................ 427/230, 236, 427/239, 372.2, 421, 426, 422; 118/300, 306, 313, 317, DIG. 10, 302; 138/145

(56) References Cited

U.S. PATENT DOCUMENTS

| | | | |
|---|---|---|---|
| 4,092,950 A | | 6/1978 | Hart |
| 4,164,799 A | | 8/1979 | Jai |
| 4,201,342 A | | 5/1980 | Stram |
| 4,216,738 A | * | 8/1980 | Muta ........................... 118/72 |
| 4,339,840 A | | 7/1982 | Monson |
| 4,503,577 A | | 3/1985 | Fowler |
| 4,517,761 A | | 5/1985 | Bleggi |
| 4,774,905 A | * | 10/1988 | Nobis .......................... 118/304 |
| 4,938,167 A | * | 7/1990 | Mizuho et al. .............. 118/306 |
| 5,232,502 A | | 8/1993 | Recker |
| 5,428,862 A | | 7/1995 | Sailer |
| 5,762,708 A | | 6/1998 | Motoda et al. |
| 5,829,461 A | | 11/1998 | Ramsey |
| 6,117,242 A | * | 9/2000 | Kreiselmaier ................ 118/306 |

\* cited by examiner

Primary Examiner—Shrive P. Beck
Assistant Examiner—Kirsten Crockford Jorsley
(74) Attorney, Agent, or Firm—Young & Basile P.C.

(57) ABSTRACT

A method of creating a self-supporting waterproof lining in an underground pipe involves pulling a small carriage through the pipe and operating a rotary sprayer mounted on the carrier to spray an air-atomized, fast-setting organic compound on the interior of the pipe. Supply lines for air and the two parts of the compound pass through a union from the non-rotary carriage to the rotary sprayer.

5 Claims, 4 Drawing Sheets

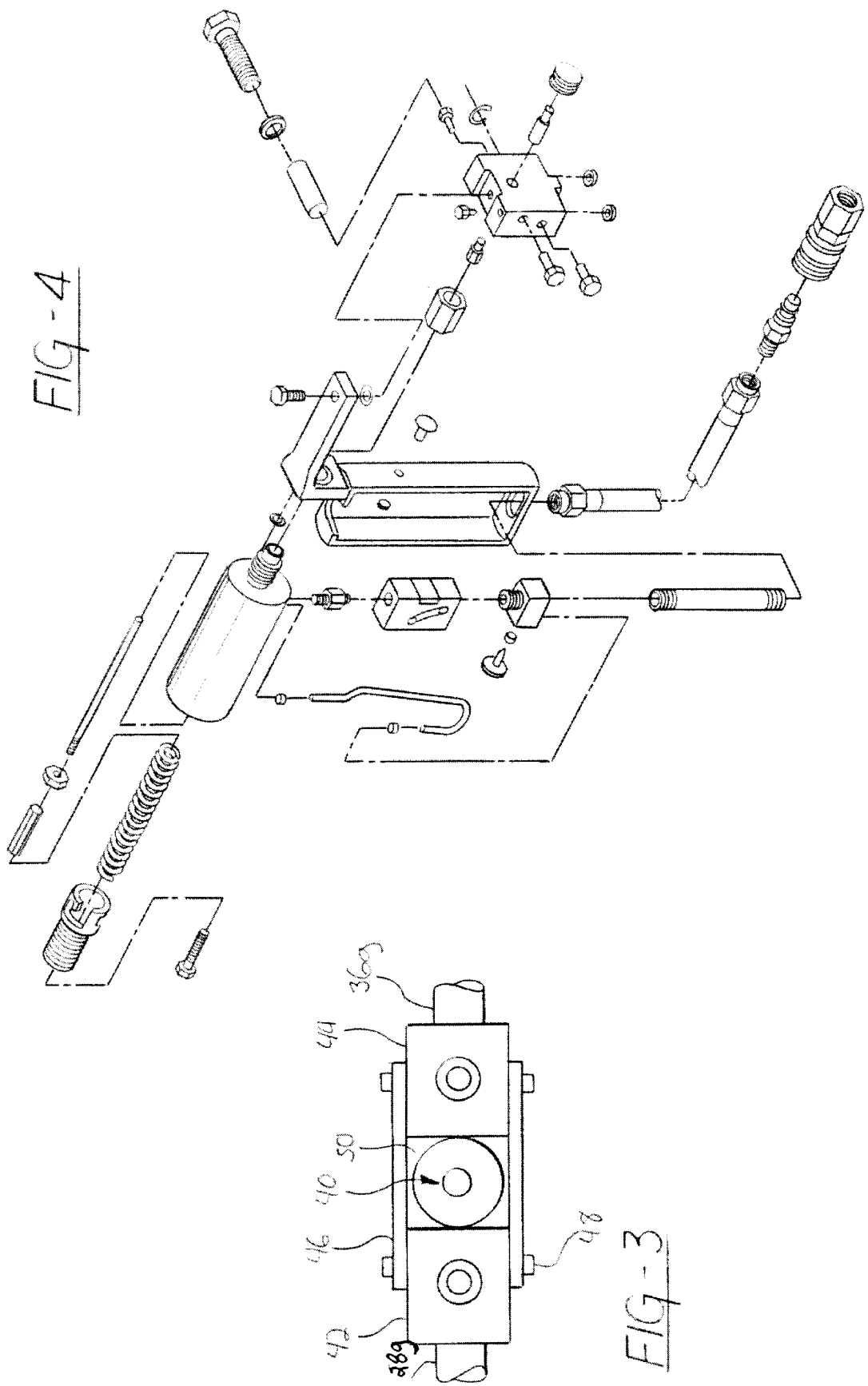

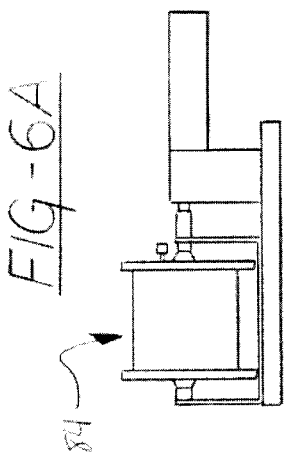
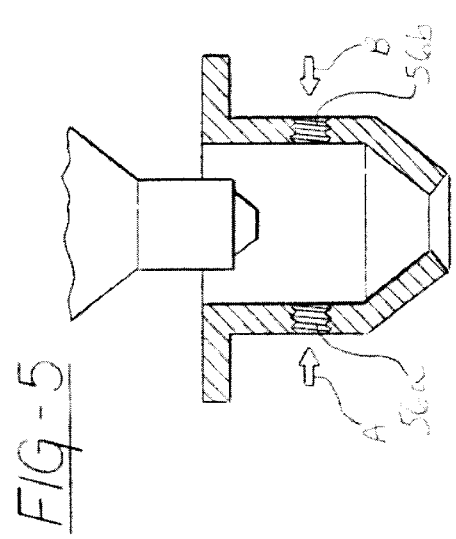
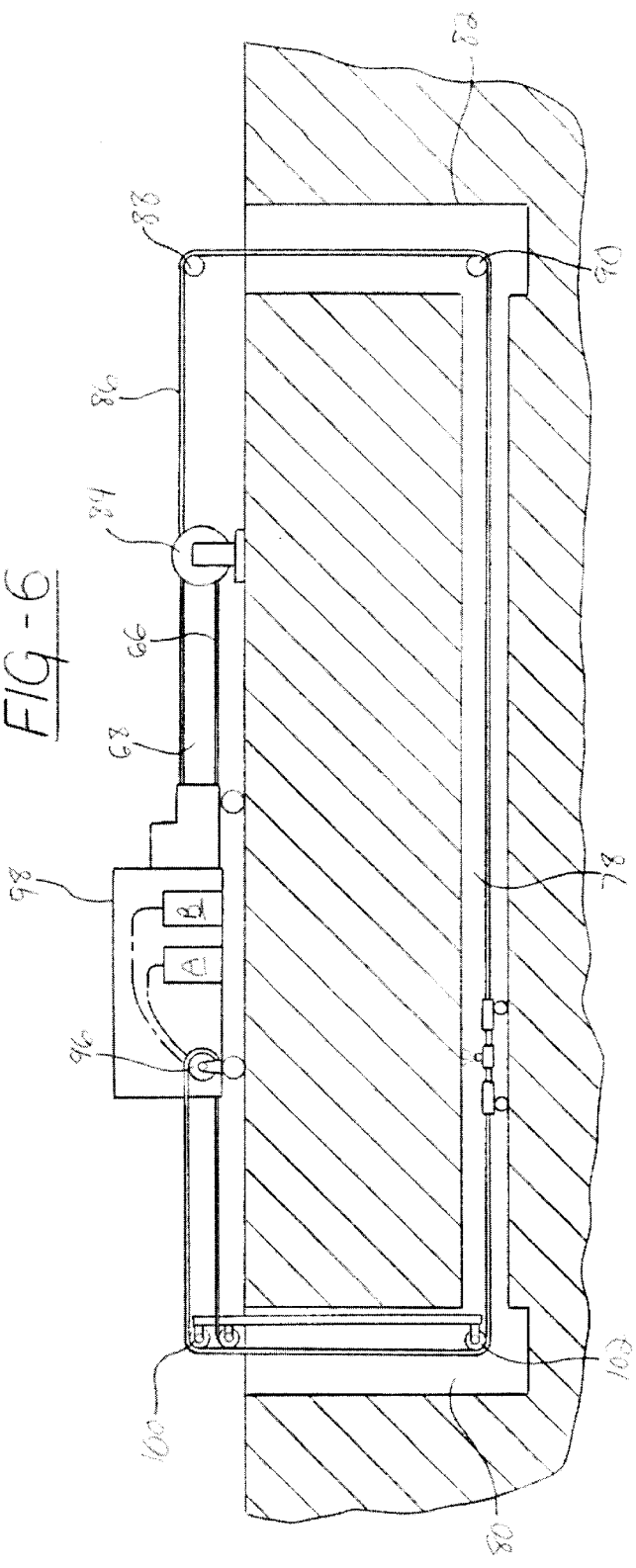

US 6,632,475 B1

METHOD OF LINING UNDERGROUND PIPES AND APPARATUS FOR PERFORMING THE METHOD

This application claims priority from the corresponding provisional application having serial No. 60/238,804 filed on Oct. 6, 2000.

FIELD OF THE INVENTION

This invention relates to a method for in-situ waterproofing of underground pipes by causing a wheeled vehicle carrying a rotary sprayer to pass through a length of pipe while spraying a fast setting organic waterproofing compound onto the interior of the pipe.

BACKGROUND OF THE INVENTION

Underground sewer and storm drainage pipes are typically made of concrete or masonry. As they get older, they become more and more permeable. Also, it becomes more and more likely over time that joints will have opened or separated due to ground movement. The result is pipes which leak water or other materials, absorb water from the outside and are susceptible to collapse and crumbling due to the deterioration of the concrete or masonry walls. Once these pipes are installed underground they are extremely difficult to repair even though access through manholes and the like may be provided at intervals such as 50' to 300'. Often the repair of such underground pipes involves digging them up and replacing them.

SUMMARY OF THE INVENTION

The method of the present invention, generally described, involves placing a rotary spray device capable of generating a cylindrical; i.e., 360° spray pattern into a pipe to be lined on the interior surfaces thereof, using the device to spray a fast setting organic compound onto the interior of the pipe or line while causing the device to travel through at least the length of the pipe and, thereafter, removing the device from the pipe.

It has been found that through the proper selection of materials to be sprayed, typically using air for atomization, an extremely fast setup may be achieved which prevents sagging or dripping of the material from the interior surfaces of the line or pipe. Materials and air are typically supplied to the spray device from the surface through supply lines and the device, although it may be self propelled, it is typically pulled through the lines for a length of between, for example 50' and 300'.

The apparatus aspect of the present invention provides a wheeled carrier which, as hereinafter described is preferably constructed in two longitudionally spaced parts, a rotary spray device of conventional design mounted on the carrier between the spaced parts for rotation about an axis which is parallel to the longitudinal axis of the pipe or line through which the vehicle is moved, thereby to provide a cylindrical spray pattern. The apparatus further comprises a motor, typically an air motor, mounted on the carrier for rotating the spray device about said parallel axis and one or more supply lines for conveying air and material to the spray device from a remote supply location.

As indicated above the wheeled carrier and the rotary spray device are caused to be moved through a length of pipe or line and the supply lines and motor are operated to cause a cylindrical spray pattern of material to be deployed from the device to the interior surfaces of the pipe through which the device moves. By using a fast setting two part compound of organic materials, use of the apparatus can create a self-supporting waterproof structure within the interior of the old and potentially crumbling concrete or masonry pipe or line.

BRIEF DESCRIPTION OF THE DRAWINGS

The description herein makes reference to the accompanying drawings wherein like reference numerals refer to like parts throughout the several views, and wherein:

FIG. 3 is a view of the rotary spray device showing the interconnection of the supply lines.

FIG. 4 is an exploded view of a spray gun assembly usable in the system or apparatus of FIG. 1.

FIG. 5 is a detail of the spray gun as modified in accordance with the present invention.

FIGS. 6 and 6A is a diagram of a typical application of the device or apparatus of FIG. 1 to an underground line or pipe.

DESCRIPTION OF THE PREFERRED EMBODIMENT

This invention relates to a rotary applicator for lining the inside of new and existing pipes with polyurea coating. Typical applications will be for relining or waterproofing tunnel-like or pipe-like concrete or masonry structures. However, there is no technical reason why the method and apparatus of the present invention cannot be used in connection with pipe or the like of any construction which is subject to deterioration over time. The unit is designed to apply a coating according to manufacturer specifications at a mil thickness required to create a self-supporting membrane that will eliminate leaks within the pipe. This technique is a "trenchless technology" and improves on current methods of in-ground pipe repair commonly used today. The coating is an approved material for this application but requires a rotary applicator to properly apply it into the interior of the pipes where the diameters are too small for a man to enter.

The polyurea coating material is a plural component, elastomeric product derived from a mixture of fast gelling amine and isocyanate components hereinafter designated component "A" and component "B", respectively. The combination of the A and B components is hereinafter referred to as a "two-part amine compound". Properly applied, the coating resulting from the mixture of the A and B components will produce a flexible, tough, resilient monolithic membrane with good water and chemical resistance that can be walked on or handled within one minute of application. The material can be sprayed directly to damp or cold surfaces and, with a gel time of less than two seconds, can be applied up to any thickness in one application including vertical and overhead surfaces. The fast gel time of the mixed components requires the material to be applied with spray application equipment. The general specifications for the equipment describe pumping equipment that will deliver the separate components at a 1:1 volume ratio, heated to 160–170° F., with a dynamic pressure of at least 1,000 psi.

Figure 1:
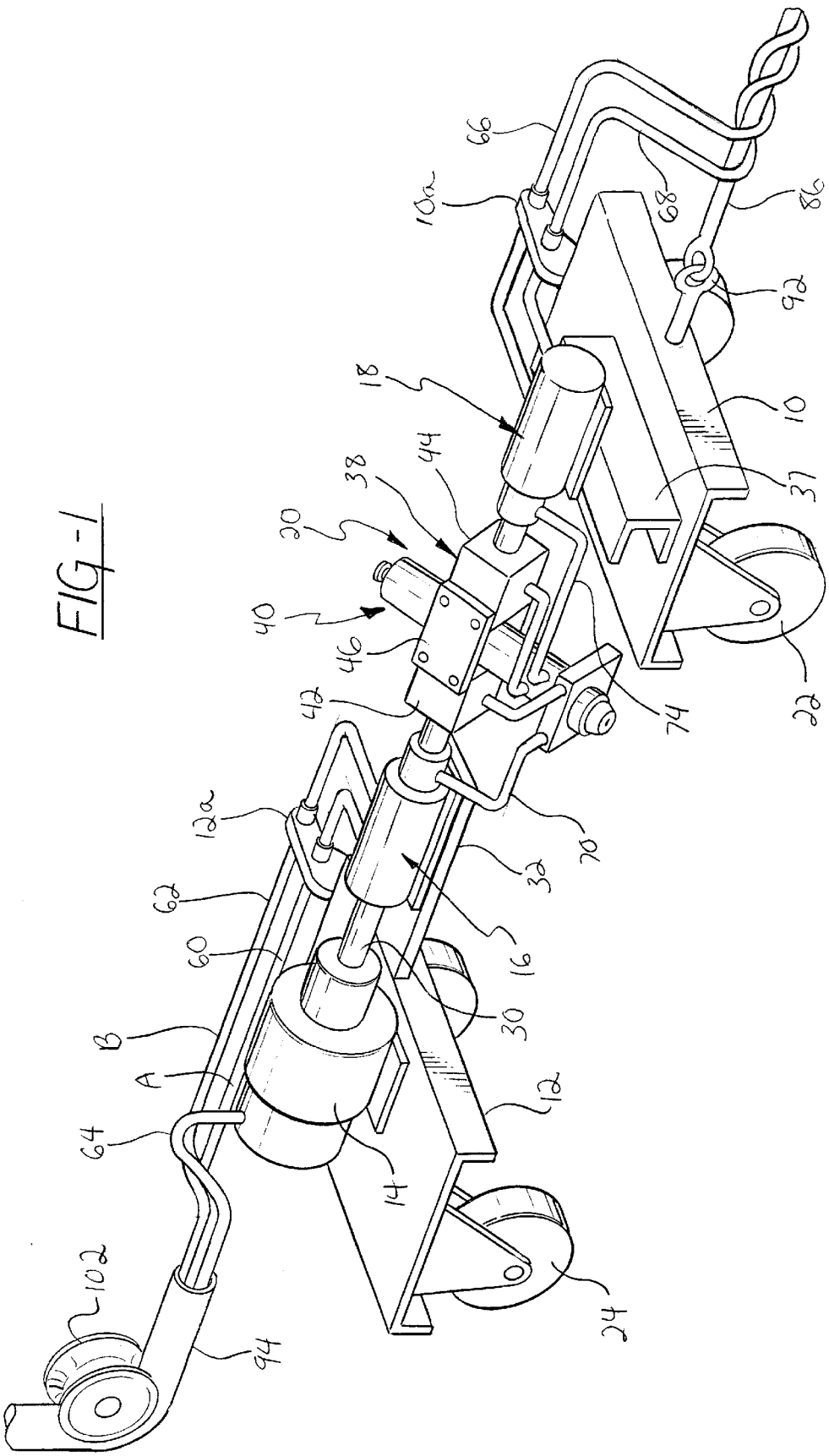
FIG. 1 is a perspective view of a wheeled carrier and rotary spray device constructed in accordance with the present invention.

The apparatus as seen in FIG. 1 includes a wheeled carriage having a leading portion 10, a trailing portion 12, an air motor 14 carried by the trailing portion 12, a rear rotary union 16, a front rotary union 18 and a rotary spray gun assembly 20.

The leading cart portion 10 includes a plate like body 21 with plastic wheels 22 and the trailing carrier portion 12 includes a plate like body 23 having plastic wheels 24. The wheels enable the device to be moved, in a manner to be subsequently described, through the interior of a pipe to be coated.

Rotary motor 14 is a standard air drive gear motor such, for example, as an air motor available from Gast Corporation of Benton Harbor, Mich. as Model No. 4AM-RV-575-GR20.

Figure 2:
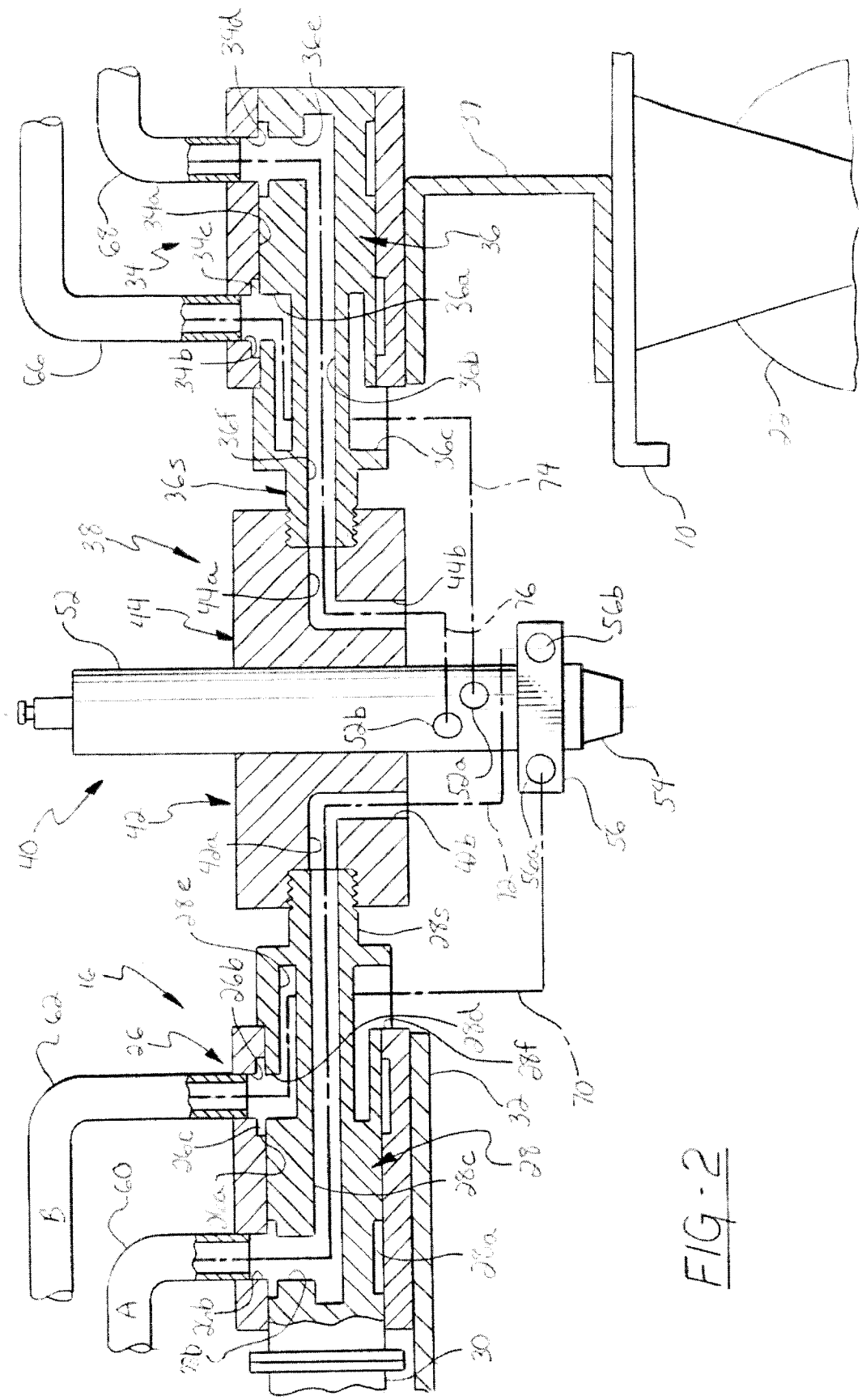
FIG. 2 is a sectional drawing of a rotary union which is used to convey spray materials through a rotary joint i.e., from the stationary carrier to the rotary spray device of the device of the apparatus of FIG. 1.

Rotary union 16, as best seen in FIG. 2, is intended to define separate paths for components A and B which are to be mixed at the spray gun assembly 20 to form the polyurea compound. Component A may comprise, for example, amine terminated polyether resins, amine chain extenders, or MDI prepolymers and component B may comprise, for example, a polyol isocyanate.

Rotary union 16 includes an outer cylindrical housing 26 defining a central bore 26a and a rotary member 28 journaled in the bore 26a of the outer member and driven by the output shaft 30 of air motor 14. Outer member 26 is fixedly mounted on an apron structure 32 forming a forward extension of trailing cart 12. The path for component A in rotary union 16 comprises a port 26b in the outer member, an annular chamber 28a in the rotary member, a port 28b in the rotary member, and a central bore 28c in the rotary member. The path for component B through the rotary union 16 comprises a port 26b in the outer member, an annular chamber 26c in the outer member, a port 28d in the rotary member, an annular passage 28e in the rotary member, and a port 28f in the rotary member.

Rotary union 16 may comprise, for example, a unit available from Deublin Corporation of Waukegan, Ill. as Deublin Deu-Plex Motor No. 1690, modified to allow the rotary member to be driven by the output shaft 30 of the air motor.

Rotary union 18 is intended to provide separate paths for pressurized trigger air, and atomizing air, to be delivered to the spray gun assembly 20. Union 18 is generally similar to union 16 and may also comprise a Deublin Due-Plex Model 1690 union. Specifically, union 18 may comprise an outer cylindrical member 34 defining a central bore 34a and a central rotary member 36 journaled in bore 34a. Outer cylindrical member 34 is fixedly mounted on a channel bracket 37 mounted on leading cart 10. The path for the atomizing air through the union for delivery to the spray gun assembly is defined by a radial bore 34b in outer member 34, an annular chamber 34c in the outer member, a radial port 36a in the inner rotary member, an annular passage 36b in the inner member, and a radial port 36c in the inner member. The path for the trigger air through the rotary union 18 for delivery to the spray gun assembly comprises a radial port 34d in the outer member, an annular chamber 36d in the inner member, a radial port 36e in the inner member, and a central bore 36f in the inner member.

Spray gun assembly 20 includes a manifold structure 38 and a spray gun 40.

Manifold structure 38 comprises left and right blocks 42 and 44 and upper and lower plates 46 and 48 (see also FIG. 3). Blocks 42 and 44 are sandwiched between upper and lower plates 46 and 48 using suitable fasteners with a space 50 defined between the blocks to accommodate spray gun 40. Block 46 is suitably bored to define an inlet passage 42a and an outlet port 42b and block 44 is similarly bored to define an inlet port 44a and an outlet port 44b. A nipple 28g on the forward end of inner rotary member 28 of union 16 is suitably received in port 42a and a nipple 36g on the forward end of rotary member 36 of union 18 is suitably received in port 44a.

Spray gun 40 may be of the type available, for example, from Gusmer Corporation of Lakewood, N.J. as Part No. 2100J-CSTM, shown in FIG. 4.

Spray gun 40 is suitably and fixedly positioned in the space 50 defined between blocks 42 and 44 and upper and lower plates 46 and 48 and includes a barrel 52 extending through opening 50, a nozzle 54 and a manifold plate 56 including inlet ports 56a and 56b for receipt of components A and B for mixture in the nozzle (see also FIG. 5).

A conduit 60 directs component A from a suitable source to port 26b; a conduit 62 directs component B from a suitable source to port 26b; a conduit 64 directs pressurized air from a suitable source to air motor 14 for operation of the motor in known manner and rotation of output shaft 30; a conduit 66 directs pressurized atomizing air from a suitable source to port 34b; a conduit 68 directs pressurized trigger air from a suitable source to port 34d; a conduit 70 connects port 28f to port 56a; a conduit 72 connects port 42b to port 56b; a conduit 74 connects port 36c to a port 52a in the barrel 52 of the gun; and a conduit 76 connects port 44b to a port 52b in the barrel of the gun. Conduits 60 and 62 may be supported, for example, by a bracket 12a carried by trailing cart 12 and conduits 66 and 68 may be supported, for example, by a bracket 10a supported by leading cart 10.

In use, and as seen in FIGS. 6 and 6A, the applicator is positioned in an underground pipe 78 requiring repair. The pipe may be accessible at opposite ends in known manner via manholes 80 and 82. The applicator may be self-propelled or, as shown, may be pulled through the pipe utilizing a winch 84 positioned above around and powering a cable 86 directed by pulleys 88 and 90 into pipe 78 for connection to an eye bolt 92 provided on leading cart 10. It will be seen that actuation of winch 84 in a sense to wind up cable 86 will have the effect of gradually pulling the applicator through the pipe 78. Conduits 66 and 68 are preferably wound around cable 86 so as to provide convenient access to the conduits and facilitate the delivery of pressurized air through the conduits to the applicator.

Conduits 60, 62, and 64 may be directed to the applicator via a cable bundle 94. Cable bundle 94 may, for example, be paid out from a drum 96 located in the cargo bed of an aboveground motor vehicle 98 and directed to pipe 78 via pulleys 100 and 102. A source of materials A and B may be positioned in the cargo bed of the motor vehicle for selective delivery to conduits 60 and 62. The components are preferably delivered to the conduits 60 and 62 in heated form and the cable bundle 94 is preferably heated to maintain the temperature of the components flowing to the applicator.

As the applicator is pulled progressively through the pipe 78 to be repaired, pressurized air is supplied to air motor 14 via conduit 64 to rotate the spray gun assembly, pressurized air is delivered via conduit 68 and through union 18 to the spray assembly to trigger the gun, pressurized air is thereafter supplied through conduit 66 and through union 18 to the gun to provide atomizing air for the gun, and components A and B are delivered in heated form through conduits 60 and 62 and via union 16 to ports 56a and 56b of the gun. The components instantaneously mix and produce a gel coating which is sprayed by a nozzle 54 onto the inner wall of the pipe so that a coating of a desired mil thickness is uniformly applied to the interior surface of the pipe as the applicator is pulled through the pipe. The mil thickness of the coating applied will of course depend on such parameters as the speed with which the applicator is pulled through the pipe and the rate at which components A and B are supplied to the gun as the applicator is pulled through the pipe. The coating may be applied in one pass through the pipe or, alternatively, multiple passes may be made through the pipe to provide the desired thickness. The thickness may, for example, vary from between ¼– to ⅜– and may be self-supporting whereby to provide an effective repair to even pipes that are severely damaged. A movement rate through the pipe of one foot per minute has been found to provide an effective coating in most applications.

As stated above, underground sewer and storm drainage pipes, especially those made of concrete or masonry, are susceptible to deterioration over time due to the passage of fluids through the lines and pipes as well as to damage due to ground movement. Because they are installed underground at varying depths, they are difficult to repair through any method other than to dig the lines up and replace them. The process of the present invention obviates such extreme measures by using a rotary spray device to coat the inside surface of an in-situ sewer or storm drainage pipe with a fast setting organic material of such thickness and strength that it actually can be thought of as.creating a new pipe within the old pipe; i.e., the old pipe simply acts as a mold for the in-situ creation of a new long-lasting leak proof pipe within the old pipe. Setup time may be on the order of 5 seconds or less so that the material does not sag or run down the walls of the pipe.

An electrical line may also be run to the cart to supply power to and take signals from a TV camera mounted on the front of the cart for original inspection and/or process monitoring purposes. The wheels of the carts are plastic and may be configured to provide a centering feature when traveling the curved interior walls of a medium diameter pipe. The speed of rotation of the gun is approximately 10 rpm and spray pressure is approximately 1,000 psi. The A and B components of the epoxy material are mixed within the nozzle of the gun and exit through a single needle valve controlled spray outlet. The components A and B are preferably heated to a temperature of 140 to 160° F. and maintained at that temperature as they are delivered to the cart via the heated cable bundle. Component A may comprise, for example, a polyurea resin in liquid form and component B may comprise an isocyanate also in liquid form which accelerates the dry time and facilitates curing of the material. The components A and B may, for example, and as seen in FIG. 6, be provided in containers positioned within the vehicle 98 and arranged to feed their respective components to the hoses 60 and 62 positioned within the cable bundle 94. It will be understood that the cable bundle 94 is paid out along with the applicator so that the supply hoses may follow along as the applicator moves along the pipe 78.

In a similar manner, and as also seen in FIG. 6, the trigger air and atomizing air lines 66 and 68 are paid out and paid in at the winch 84 as the cart moves up and down the pipe 78. Although the applicator is shown as being pulled manually through the pipe 78, it is within the contemplation of the invention that the applicator could be self-propelled through the pipe.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for the in-situ construction of a waterproof interior lining in an underground pipe comprising the steps of:

placing a carrier device having a rotary spray nozzle in the pipe to be lined;

supplying a fast-setting organic compound to the nozzle;

causing the organic compound to be atomized and sprayed from the nozzle while rotating the nozzle about an axis essentially parallel to the longitudinal axis of the pipe and simultaneously advancing the carrier device through the pipe at a rate which produces a helical spray pattern thereby causing the compound to set up quickly to produce a waterproof structure within the pipe having such thickness and strength that it is self supporting; and, thereafter, removing the carrier device from the pipe.

2. A method as defined in claim 1 wherein the compound is a two-part amine compound which, when air-atomized, sets up in about five seconds or less when sprayed to a thickness of about ¼".

3. A method as defined in claim 1 wherein the rate of advance through the pipe is on the order of one foot per minute.

4. A method as defined in claim 1 wherein the compound is heated.

5. A method as defined in claim 4 wherein the compound is supplied from a source remote from the pipe.

* * * * *